Jan. 3, 1950  W. F. WEBER  2,493,707
METHOD OF SKINNING MEAT
Filed Oct. 20, 1944  4 Sheets-Sheet 1
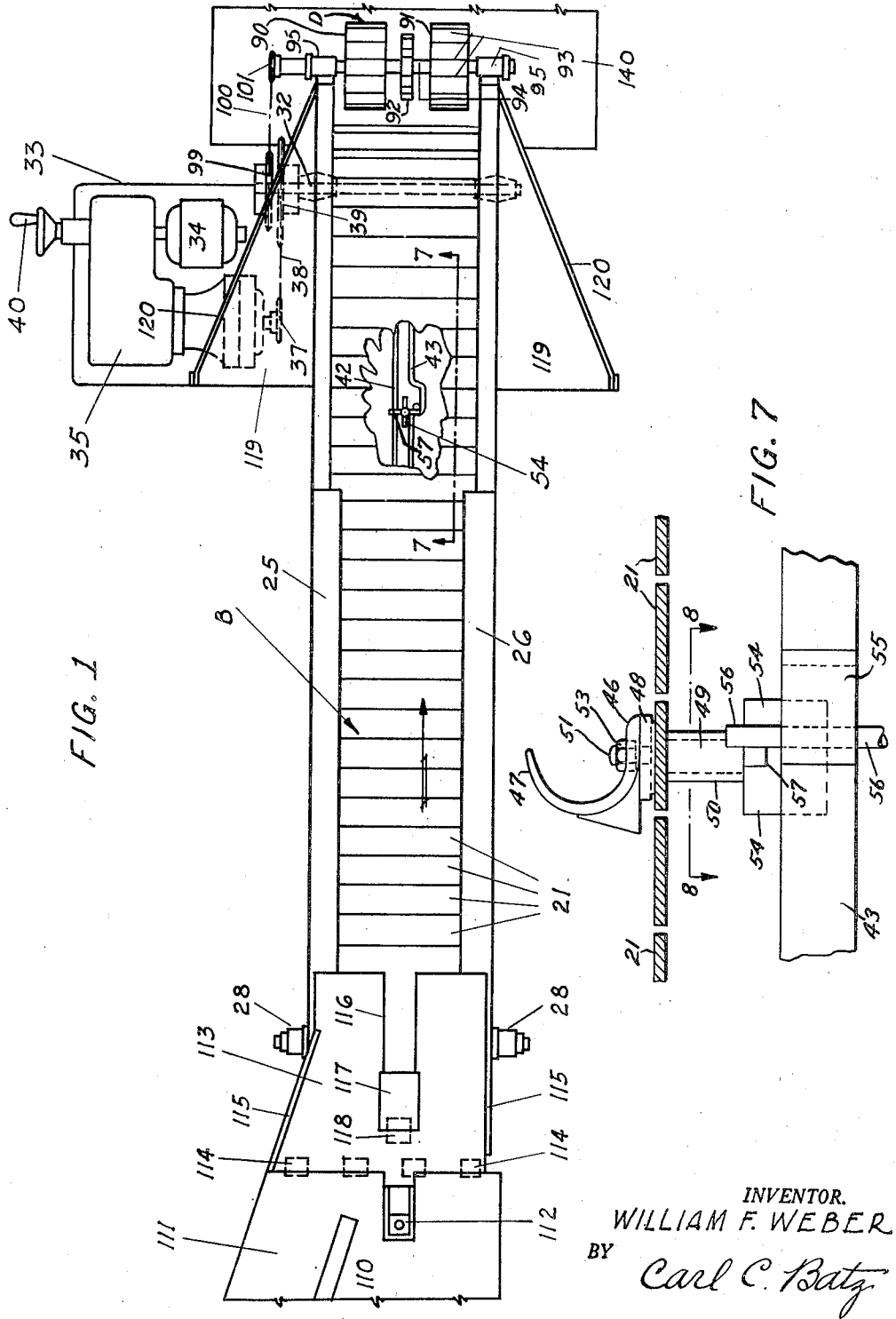
INVENTOR.
WILLIAM F. WEBER
BY
Carl C. Batz
ATTORNEY

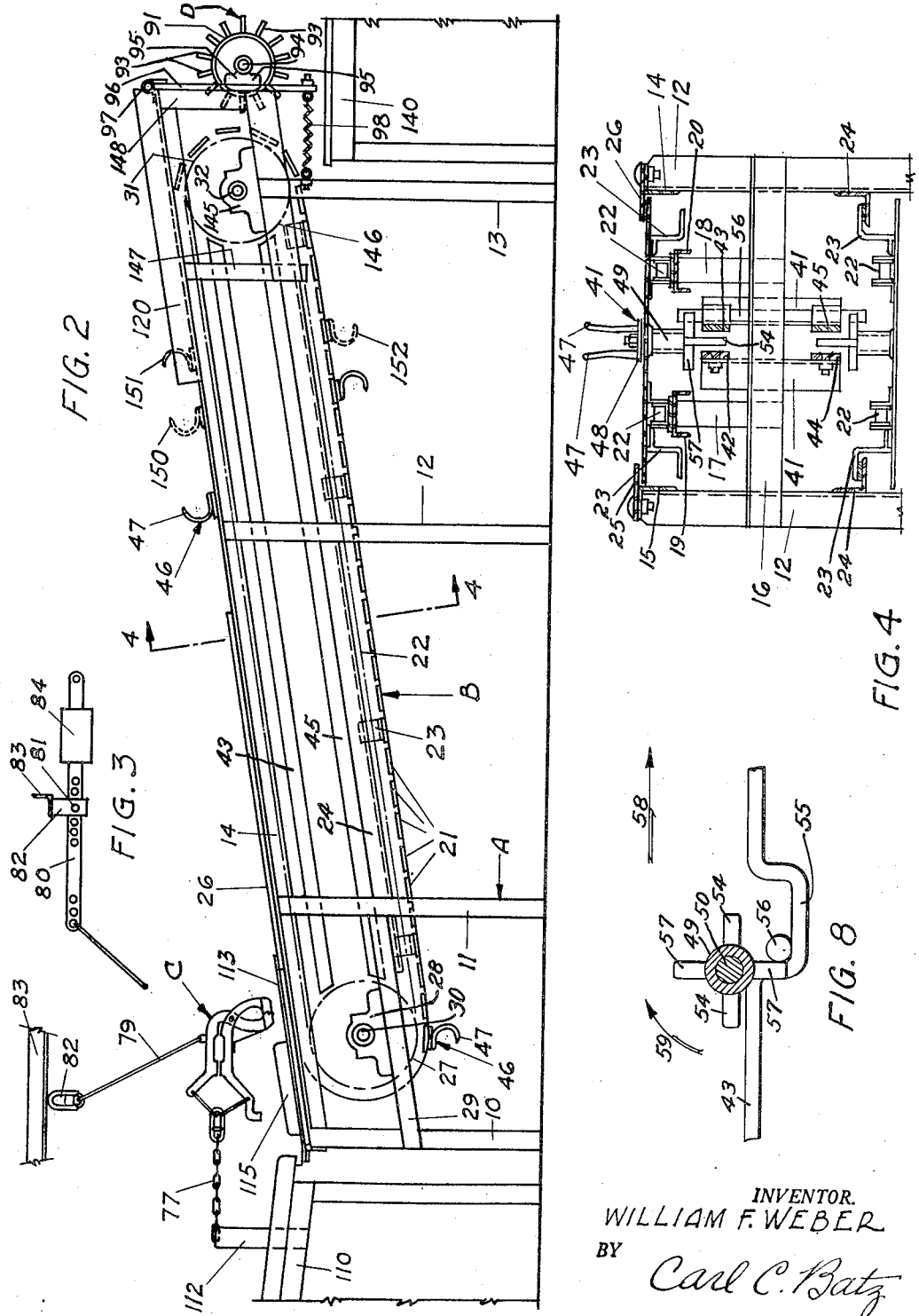

Jan. 3, 1950 W. F. WEBER 2,493,707
METHOD OF SKINNING MEAT
Filed Oct. 20, 1944 4 Sheets-Sheet 3
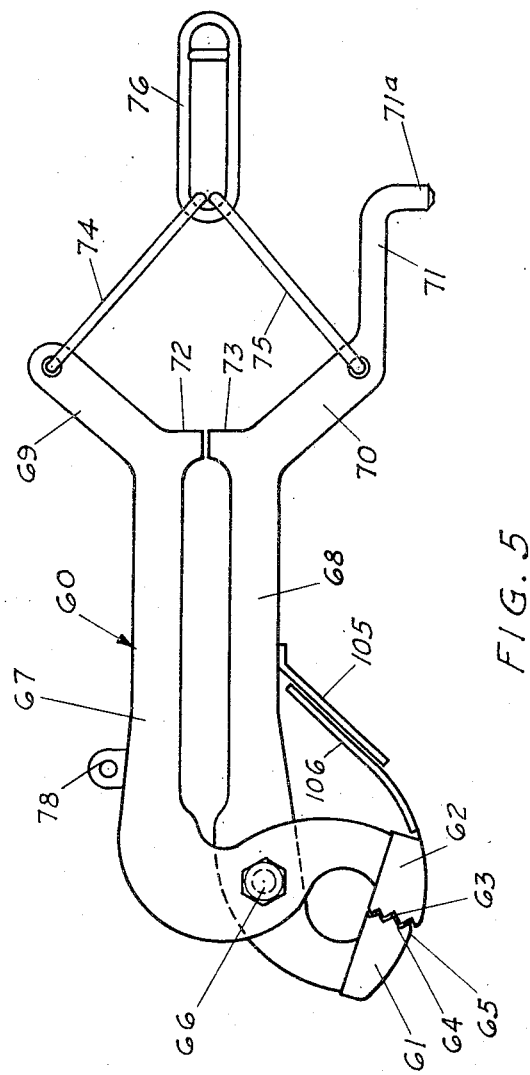
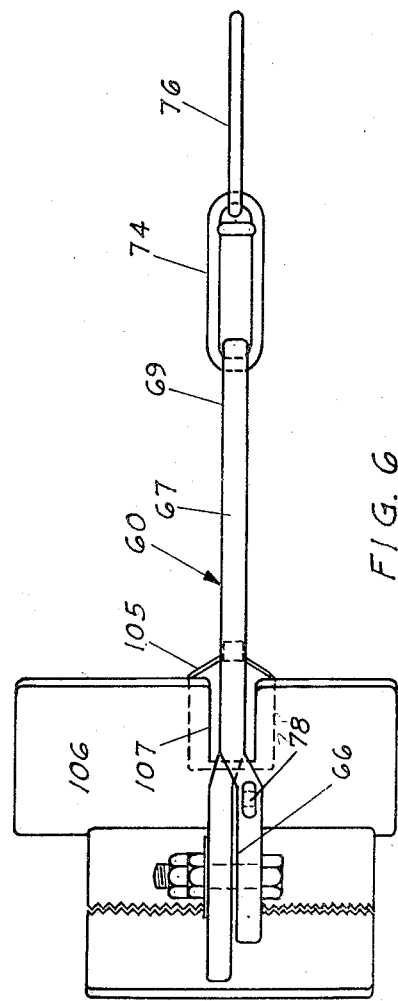
INVENTOR.
WILLIAM F. WEBER
BY
Carl C. Batz
ATTORNEY Jan. 3, 1950 W. F. WEBER 2,493,707
METHOD OF SKINNING MEAT
Filed Oct. 20, 1944 4 Sheets-Sheet 4
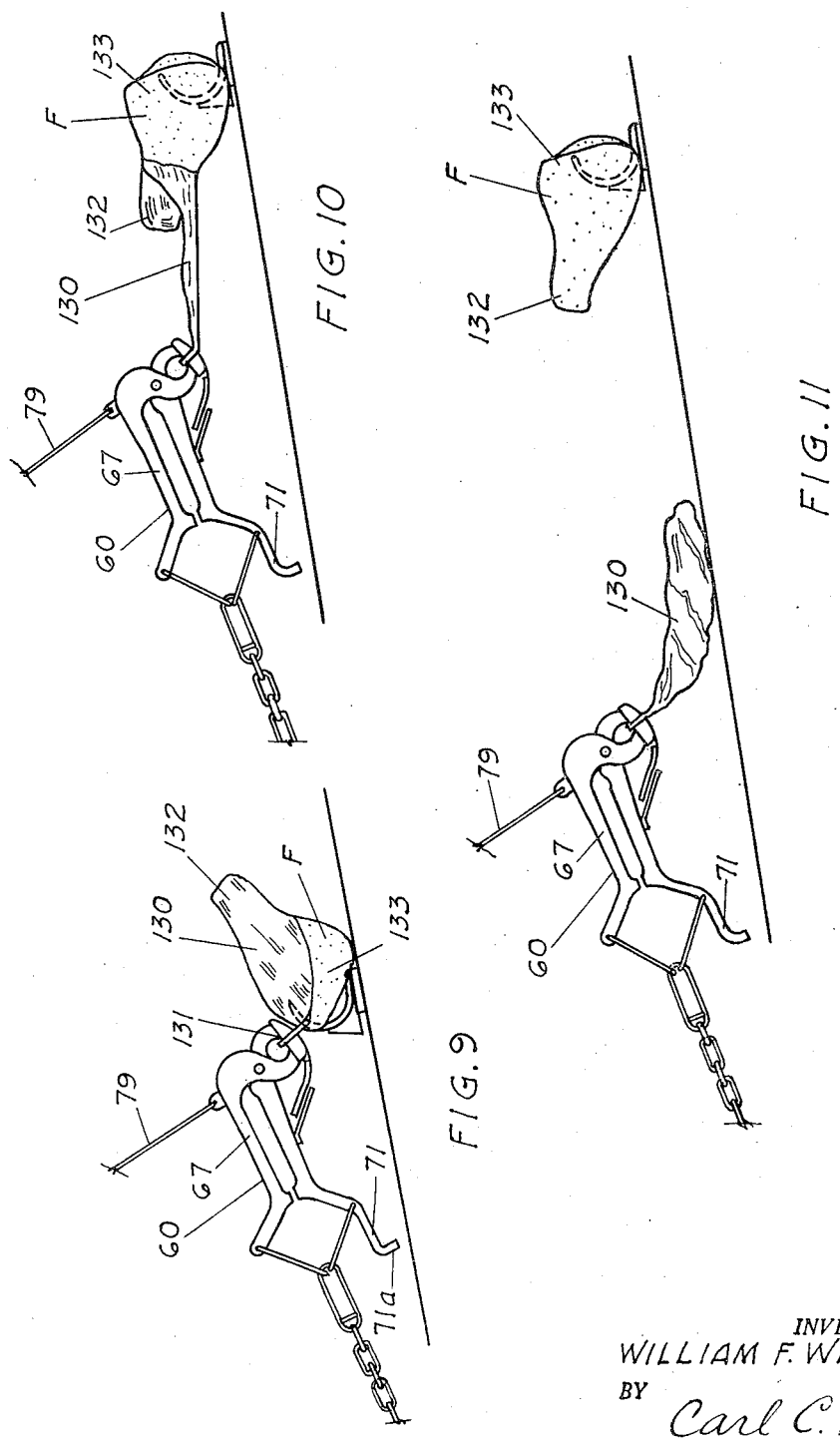
INVENTOR.
WILLIAM F. WEBER
BY Carl C. Batz
ATTORNEY Patented Jan. 3, 1950

2,493,707

UNITED STATES PATENT OFFICE 2,493,707

METHOD OF SKINNING MEAT

William F. Weber, Chicago, Ill., assignor to Armour and Company, Chicago, Ill., a corporation of Illinois Application October 20, 1944, Serial No. 559,548

4 Claims. (Cl. 17—45)

This invention relates to a method of skinning meat pieces such as hams, pork shoulders, and the like.

In the past it has been the usual practice in packing houses to remove the skin from pork shoulders and other meat pieces by hand operation, using a skinning knife. Hand skinning requires considerable care and skill and is a tedious, time-consuming operation. In practice a certain amount of meat is unavoidably removed with the skin in hand skinning. Any meat removed along with the skin is wasted, and this is to be avoided if possible. Also, in hand skinning the skins are frequently cut, making them unsuitable for tanning.

An object of the present invention is to provide a method of removing the skin from the meat pieces in a rapid, efficient manner and which can be effectively performed by machine operations rather than by hand cutting. It is further desired that the method be effective for removing the skin whole and clean of surface meat.

More specific features of the invention include the provision of a counter-balanced clamping device which normally remains open and suspended and which may be easily affixed to a piece of skin by the operator. Another feature is the provision of means for moving the meat pieces while permitting them to turn as the skin is removed. Another feature is the provision of means for turning the skinned pieces to permit their discharge from the machine after the skinning operation. Many other features and advantages of the invention will be apparent as the detailed description proceeds.

One embodiment of the invention is illustrated by the accompanying drawing in which—

Fig. 1 is a plan view of the machine; Fig. 2 is an elevational side view of the machine; Fig. 3 is a detailed view of the clamp suspending device; Fig. 4 is a sectional view, the section being taken as indicated at line 4—4 of Fig. 2; Fig. 5 is an enlarged elevational view of the clamping device; Fig. 6 is an enlarged plan view of the device shown in Fig. 5; Fig. 7 is an enlarged sectional view showing details of the hook and turning mechanism, the view being taken as indicated at line 7—7 of Fig. 1; Fig. 8 is a detailed view showing the construction of the turning mechanism, the view being taken as indicated at line 8—8 of Fig. 7; Fig. 9 is a view illustrating the operation of the machine and showing the clamping mechanism in a position holding a piece of meat with the meat piece in condition for forward movement; Fig. 10 is a view similar to Fig. 9 but showing the meat being skinned, the skin being partly removed; and Fig. 11 is a view similar to Fig. 9 and Fig. 10 but showing the meat piece after the skin has been removed and the pieces passing onwardly in the machine.

As illustrated, the improved machine includes a frame A in which is carried the conveyor B for moving the meat pieces forwardly, a clamping device C for holding the skin, and mechanism D for removing the meat from the conveyor.

The frame A may be of any construction which is adapted to suitably support the conveyor. In the embodiment illustrated the frame includes the pairs of vertical standards 10, 11, 12 and 13 (Fig. 2). At the top on the right hand side is the angle 14 which is secured as by welding to the right hand standards, and at the top on the left hand side is the angle 15 which is secured as by welding to the left hand standards of pairs 10, 11, 12 and 13. Extending between the standards 12 is a cross-piece 16 (see Fig. 4) and a similar cross-piece extends between the standards 11. Supporting members 17 and 18 are secured in spaced relation to the cross-piece 16, and on top of these supporting members rests the rails 19 and 20. Similar rail supporting structure is provided in connection with the standards 11.

The conveyor B includes a series of rectangular plates 21, which are hingedly connected through chain 22 to form an endless belt. The top of this belt rides on and along the rails 19 and 20 with the chain 22 in contact with the rails. The bottom portion of the conveyor belt is maintained in position by the arm members 23 which engage the side rails 24 attached to the standards 11 and 12. The top plates 25 and 26 secured to top angles 15 and 14 respectively extend inwardly over the top of the conveyor belt and prevent distortion of the top conveyor surface.

At the rear end of the conveyor is a pulley 27 having one end of its shaft 30 journaled in the end mounting 28 which is supported on the side piece 29 secured to standards 10 and 11. The other end of shaft 30 is similarly supported on the other side of the machine.

At the forward end of the conveyor the pulley 31 has one end of its shaft 32 journaled in the mounting 145 supported on the longitudinal piece 146. The piece 146 has its ends attached to the vertical frame members 147 and 148 and is supported at its center by the standard 13. The other end of shaft 32 is supported in a similar way.

Mounted on a table 33 (see Fig. 1), at the side of the machine, is a motor 34 and gear mechanism 35 which drives shaft 32 through pulley 37, chain 38 and pulley 39 on shaft 32. A wheel 40 is provided for adjusting the gear mechanism to cause the conveyor to move faster or more slowly according to the desires of the operator.

Referring more particularly to Fig. 4, there is secured to cross-bar 16 a pair of vertical supports 41. A similar pair of supports is disposed between the standards 11. Secured to the top of the supports 41 are the longitudinal guide rails 42 and 43 and secured to the bottoms of these supports are the longitudinal guide rails 44 and 45.

Spaced along the surface of the conveyor at the desired intervals are hook members 46. These members are disposed centrally of the conveyor and are each pivotally secured to one of plates 21.

As seen in Fig. 4 and Fig. 7 a pair of spaced, curved hooks 47 are secured at their bottom positions with a block 48 which rides on top of the conveyor surface. A sleeve 50 is secured, as by welding, to the underside of plate 21, and a stem 49 extends within sleeve 50, through an aperture in the plate 21, and has a reduced top extension 51 which passes through an aperture in block 48 and has its threaded end engaged by nut 53. At the lower end of stem 49 is a flattened extension 54 which extends between the guide rails 42 and 43 when passing forwardly with the top of the conveyor, and between guide rails 44 and 45 when returning with the bottom of the conveyor.

The flattened extensions 54 slide along and are guided by rails 42 and 43 so that the hooks 47 are pointed forwardly as they move forwardly along the top of the conveyor. In order to turn these hooks to permit more convenient discharge of the meat pieces, turning mechanism is provided. As shown in the broken out portion of Fig. 1 and also in Fig. 8, rail 43 is provided with a U-shaped portion 55, and below this the rail 45 is provided with a similar U-shaped portion. The pin 56 is secured to portions 55 of rails 43 and 45 in the position shown in Fig. 8 and has its ends protruding above and below rails 43 and 45 as indicated in Fig. 4 and Fig. 7. Each of stems 49 is provided with the lateral bars 57 which extend perpendicularly of the flattened extensions 54 and above rails 42 and 43. When these pieces are returning on the under-side of the conveyor the bars 54 pass beneath rails 44 and 45.

As hook members 46 pass forwardly on the top of the conveyor, the extensions 54 approach the U-shaped portions 55, traveling in the direction indicated by arrow 58. One end of a bar 57 will strike the top portion of the pin 56 and further forward movement of the piece rotates it in the direction of arrow 59, the U-shaped portion of rail 43 permitting the turning of the flattened extension 54. Further forward movement of the piece is permitted with the flattened extension 54, now rotated through 180°, being guided by the rails 42 and 43.

The device C for holding the skin includes a clamp 60 which is more clearly illustrated in Fig. 5 and Fig. 6. This device includes a pair of jaws 61 and 62 which extend downwardly at an angle. These jaws have irregular contacting surfaces 63 and 64, which are complementary to each other, the raised portions of one surface fitting in the channeled portions of the other surface so as to provide an efficient grip on the skin. The surface 64 on the forward jaw 61 is shorter than the surface 63 and it terminates in a curved end surface 65. This structure is important in preventing tearing of the skin at points immediately adjacent the gripping surfaces of the clamp.

Jaws 61 and 62 are pivoted at 66 and the curved levers 67 and 68 extend rearwardly to provide the diverging portions 69 and 70. The lower diverging portion 70 has a rearward leg portion 71 having the toe 71a adapted to engage a table or other supporting surface. Inward of the diverging portions 69 and 70 are the bosses 72 and 73 which are adapted to contact each other to form a stop as the jaws become completely closed. Links 74 and 75 each have their one end attached to the end of the diverging portions 69 and 70, and have their other ends engaged by the link 76. Link 76, in turn, is connected with the chain 77.

Attached to jaw 62 is the curved guard plate 106. The outer surface of the guard plate 106 is flush with the end surface of the jaw 62. As seen more clearly in Fig. 6, the guard plate 106 extends laterally beyond the jaws 61 and 62. The central portion of guard 106 is slotted as indicated at 107, so that when the arms 67 and 68 are moved apart to open the jaws the arm 68 may move into the slot 107. A lip guard 105 extends beneath the guard plate 106 and is secured at its top with the arm 68. This lip guard 105 effectively protects the slotted portion 107 when the clamping device is closed. By providing the guard means just described, the hook members 46 are prevented from catching on the jaws of the clamping device as they move forwardly on the conveyor just below the clamping mechanism.

The uppermost lever 67 is provided with an apertured ear 78 to which the end of cable 79 is attached. The other end of cable 79 is attached to the end of lever 80 shown in Fig. 3. Lever 80 is pivotally supported at 81 by means of the bracket 82 on any suitable support such as the angle 83. On the end of lever 80 opposite the attachment of cable 79 is a weight 84 which is suitable for balancing the weight of the mechanism C and normally holding this clamp suspended and in open position.

The links 74, 75 and 76 when in loose condition will permit the lever arms 67 and 68 to come apart when the clamping device is suspended by means of cable 79 so that the clamp is held in open condition, but when chain 77 is drawn taut the clamp links 74 and 75 are pulled inwardly to tightly close the jaws on whatever is between them.

The mechanism D for removing the meat from the conveyor includes wheels 90 and 91 and the intermediate wheel 92, each of which is equipped with fingers 93. The wheels 90 and 91 are so spaced on shaft 94 as to permit the passage of the hook members 47 between them, and the wheel 92 is at the transverse center of the conveyor so that the hooks 47 will pass on each side of it. The shaft 94 has its ends journaled in the mountings 95 which are attached to the carriage 96 hingedly supported on the frame at 97. The lower portion of carriage 96 is secured against the far end of the frame by means of the springs 98 extending between this lower portion and standards 13.

Shaft 94 is driven through pulley 99 on shaft 32, chain 100, and pulley 101 on shaft 94.

I prefer to utilize a stationary structure 110 (Fig. 1 and Fig. 2) which has a slanted top and provides a chute 111 for passing to the machine the pieces to be skinned. Suitably, the piece 112 attached to this structure 110 may be employed for securing the rear end of chain 77 holding the clamping device C.

Over the rear end of the conveyor structure is a plate 113 which is hingedly connected to the frame at 114 and which serves as a table on which the meat may be placed preparatory to skinning. Suitably, this plate 113 may have the side pieces 115. The central portion of the plate may be slotted at 116, the slot being of sufficient width to permit the passage therethrough of the hook members 46. Desirably, a flap 117 may be disposed over the rear end of slot 116 and hingedly connected to the plate 113 at 118. When the hook members 46 turn about pulley 27 from the underside of the conveyor they may raise flap 117 and then pass forwardly through the slot 116, and the flap 117 may close after a hook member has passed.

At the forward end of the conveyor it is advantageous to employ a chute having inwardly inclined sides. As shown in Fig. 1 the bottom plates 119 have the inclined sides 120 which lead inwardly toward the end of the conveyor. These inclined sides operate to complete the turning of the very large pieces of meat which may not get completely turned through the operation of the turning mechanism.

Also, it is preferable to employ a table or other receiving means at the forward end of the conveyor for receiving the meat pieces as they are discharged from the conveyor. In the structure illustrated is included a table 140 onto which the pieces may be discharged through the operation of wheels 90—92.

It is a further feature of the invention that the conveyor is mounted in inclined manner as more clearly shown in Fig. 2. By this construction the meat pieces may be handled at the rear end of the conveyor at a height which is convenient to an operator, and the meat pieces will be discharged on the table 140 of substantially this same height which is convenient for the further treatment of the meat pieces by other operators.

Operation

When the machine is to be operated the motor 34 may be started through any suitable electrical connections and this operates to drive the conveyor through the drive means already described and also to drive the shaft 94 carrying wheels 90—92. Shaft 94 is driven in such direction that the periphery of wheels 90—92 moves counter to the adjacent surface of the conveyor.

The operator may stand to the left of the machine at the rear end of the conveyor and receive the meat pieces down the chute 111. The meat pieces coming down chute 111 should previously be prepared by slicing under an edge of the skin so as to leave a small flap which can be engaged by the clamping mechanism. The operator takes one of these pieces of meat such as the piece F illustrated in Fig. 9 and lays it upon the plate 113, over the slot 116. The clamping mechanism C will be suspended by means of cable 79 and the counter-balancing mechanism already described. The operator may grasp the top lever arm 67 of this device and lower it to a position where the jaws 61 and 62 may receive the edge portion or flap of the skin. In Fig. 9 to Fig. 11 the skin of the piece is indicated by the character 130 and the edge portion or flap by the character 131. In placing the meat piece on the plate 113 over the slot 116 the operator may place the shank portion of the meat, designated 132, forwardly of the machine, with the body portion 133 rearwardly. When the clamping device has been lowered by the operator and the rearward skin flap 131 placed between the jaws 61 and 62 the operator may press downwardly on the arm 67 and with the leg 71 in engagement with the plate 113 cause the jaws to become clamped about this loose edge of the skin.

As the conveyor rotates, one of the hook members 46 will pass from the bottom of the conveyor about the rear end of the conveyor and pass forwardly through the slot 116. As it does so, the curved hooks 47 engage the meat piece and form themselves about the bony structure. The points of hooks 47 will pass into the meat as indicated in Fig. 9 and will draw the clamping device C forwardly until the chain 77 becomes taut. During the initial movement of the meat piece and until the clamping device becomes tight the operator may press down on the top lever 67 with the toe 71a of lever 68 sliding along the surface of table 113. The taut condition is illustrated in Fig. 9. It will be seen that tension brought about by the engagement of the skin flap 131 tends to make the meat piece rotate, raising the shank 132. When the meat piece is passed further forwardly as indicated in Fig. 10 the meat piece rotates to the extent of bringing the shank portion 132 to a position where it points rearwardly instead of forwardly as it did in the beginning of the skinning operation. The continued forward movement of the meat piece causes the removal of the skin, the skin being turned inside out as it is removed from the central and shank portions of the meat pieces.

Fig. 11 illustrates the condition after the meat piece has been moved sufficiently forward to completely remove the skin from it. At this point the tension is relieved in chain 77, and the counter-balancing mechanism, including the lever 89 and weight 84, operates to suspend and open the clamping device, releasing the skin, and holding the device ready for the next operation. The skin 130 shown in Fig. 11 is in one piece and may be passed along the conveyor and discharged on a table 119—120 or may be caught by the operator and removed to a separate receptacle if desired. It will be noted that the support 82 holding the cable 79 is rearward of the clamping device C when this device is in its most forward position permitted by chain 77 so that the counter-balancing mechanism is useful in pulling back the clamp to a position convenient for operation on another meat piece.

As the skinned meat piece passes forwardly on the hooks in the condition illustrated in Fig. 11 it approaches the position indicated in dotted lines at 150 (Fig. 2). At this position the turning mechanism comes into operation and, as indicated in Fig. 8, the bar 57 engages pin 56 to turn the stem 49 and also the hooks 47 about 180° into the position indicated in dotted lines at 151 (Fig. 2). Thus turned, the shank portion which is indicated as pointing rearwardly in Fig. 11 is turned to again point forwardly. As the meat thus turned passes on about the end of the conveyor it is engaged by the fingers 93 of the wheels 90—92, removed from the hooks 47 and passed over wheels 90—92 onto the table 140. The hook member 46, after the meat has been discharged from it, passes on about the forward end of the conveyor and returns on the underside. As it comes to the position indicated in dotted lines at 152 (Fig. 2), the turning mechanism again comes into operation and again rotates the hooks 47 through approximately 180° so that the points of the hooks 47 again face in the direction of movement of the conveyor and are in position to engage another piece of meat after they have passed the rear end of the conveyor.

The hook members 46 may be spaced as closely on the conveyor surface as desired. However, the spacing should be sufficient to permit time in the normal operation of the machine for the operator to place the piece of meat in position and bring down the clamping device C for engagement with the edge of the skin before the succeeding hook member comes up to engage the meat piece.

By having a pair of spaced hooks 47, the individual hooks may engage different sides of a bony structure such as a joint so that the bone which extends longitudinally of the piece extends between the hooks. This structure facilitates the turning of the piece on the hook during the removal of the skin.

In the case of a large piece of meat such as a large ham, or in case of meat pieces not adapted for engagement of a bony structure by the hooks 47, the turning of the hook members may not be sufficient to get the meat piece completely turned, particularly if the meat is quite soft, and in such case the inclined guide pieces 120 complete the turning of the piece.

Should a piece of meat be so firmly fixed on hooks 47 that the mechanism D can not, or for some reason does not disengage it, breakage of the machine is avoided by the resilient pivoted mounting of the mechanism D. As the piece passes between the conveyor and wheels 90—92, the spring 98 yields to permit shaft 94 to swing outwardly about the hinged mounting at 97, thus permitting space through which the meat piece may move. If the chain 100 is not sufficiently loose to permit this outward swing of the shaft the chain will break, but may be easily replaced. Also provision is made for permitting the meat piece to pass again to the top of the conveyor without damaging the machine. As the meat piece approaches the top of the conveyor it may raise the table 113 about hinges 114 and pass under this table. This operation takes place only in emergency and to permit time for stopping the machine.

The machine described herein is claimed in applicant's co-pending application Serial No. 643,527, filed January 16, 1946.

The foregoing detailed description describes but a single embodiment of the invention. However, it is understood that many embodiments may be constructed which differ widely in structure while still including one or more of the novel principles herein set forth.

I claim:

1. A method of skinning meat pieces comprising loosening the skin at one edge of the piece with the piece disposed so that said edge is in rearward position, holding the loosened skin against forward movement, and moving said piece forwardly while permitting the piece to turn as the skin is removed therefrom.

2. A method of skinning a meat piece containing a butt and a shank portion comprising securing against forward movement an edge of skin on said butt portion with the shank portion disposed forwardly, and moving said piece forwardly while permitting the same to turn as the skin is removed to thereby cause the skin to turn inside out as it is removed from said shank portion.

3. A method of skinning a piece of meat comprising grasping and holding against forward movement an edge of skin at one end of said piece, grasping the meat piece at said end, and separating the skin and meat so grasped while turning said end of the meat piece away from said skin edge, to thereby separate the skin from the meat piece.

4. A method as in claim 3 wherein said meat piece is grasped about a bone structure thereof.

WILLIAM F. WEBER.

REFERENCES CITED

The following references are of record in the file of this patent:

UNITED STATES PATENTS

| Number | Name | Date |
|---|---|---|
| 77,724 | Eschenlohr | May 12, 1868 |
| 537,215 | Mead | Apr. 9, 1895 |
| 1,111,952 | Cunningham | Sept. 29, 1914 |
| 1,111,953 | Cunningham | Sept. 29, 1914 |
| 1,265,407 | Wallin | May 7, 1918 |
| 1,714,355 | Englen et al. | May 21, 1929 |
| 1,764,425 | Thomas | June 17, 1930 |
| 1,777,375 | Merrick | Oct. 7, 1930 |
| 1,960,643 | Lorenzen | May 29, 1934 |
| 2,123,312 | O'Conner | July 12, 1938 |
| 2,129,234 | Perrin | Sept. 6, 1938 |
| 2,261,589 | Piper | Nov. 4, 1941 |

FOREIGN PATENTS

| Number | Country | Date |
|---|---|---|
| 667,670 | Germany | Dec. 6, 1938 |